(12) United States Patent
Ito et al.

(10) Patent No.: US 11,173,905 B2
(45) Date of Patent: Nov. 16, 2021

(54) DRIVING ASSISTANCE APPARATUS

(71) Applicant: TOYOTA JIDOSHA KABUSHIKI KAISHA, Toyota (JP)

(72) Inventors: Shogo Ito, Shizuoka-ken (JP); Kohei Tochigi, Susono (JP); Yuta Ikezawa, Susono (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 193 days.

(21) Appl. No.: 16/674,744

(22) Filed: Nov. 5, 2019

(65) Prior Publication Data
US 2020/0139966 A1  May 7, 2020

(30) Foreign Application Priority Data

Nov. 7, 2018  (JP) .............................. JP2018-209801

(51) Int. Cl.
| | | |
|---|---|---|
| *B60T 7/12* | (2006.01) | |
| *B60W 30/16* | (2020.01) | |
| *B60W 10/04* | (2006.01) | |
| *B60W 10/18* | (2012.01) | |

(52) U.S. Cl.
CPC .......... *B60W 30/162* (2013.01); *B60W 10/04* (2013.01); *B60W 10/18* (2013.01); *B60W 2520/105* (2013.01); *B60W 2540/10* (2013.01); *B60W 2540/12* (2013.01);
(Continued)

(58) Field of Classification Search
CPC .... B60W 30/162; B60W 10/04; B60W 10/18; B60W 2554/804; B60W 2554/801; B60W 2520/105; B60W 2540/10; B60W 2540/12; B60W 2710/18; B60W 2720/106

See application file for complete search history.

(56) References Cited

U.S. PATENT DOCUMENTS

| | | |
|---|---|---|
| 2006/0100769 A1 | 5/2006 | Arai et al. |
| 2007/0142994 A1* | 6/2007 | Boecker ................. B60K 31/04 701/93 |
| 2009/0164109 A1 | 6/2009 | Maruyama |

(Continued)

FOREIGN PATENT DOCUMENTS

| | | |
|---|---|---|
| JP | 2003-054289 A | 2/2003 |
| JP | 2004-322729 A | 11/2004 |

(Continued)

*Primary Examiner* — Adam M Alharbi
(74) *Attorney, Agent, or Firm* — Sughrue Mion, PLLC

(57) ABSTRACT

A driving assistance apparatus performs a stop control of stopping a host vehicle so that a following distance between the host vehicle and a stopped vehicle, which is ahead in a course of the host vehicle, approaches a target following distance. The driving assistance apparatus is provided with: a setting device configured to set the target following distance smaller, if an operation speed is less than a predetermined speed, in comparison with that if the operation speed is greater than the predetermined speed when one of an acceleration off operation and a brake off operation is performed, or when one of an accelerator opening degree corresponding to an operation amount of an accelerator pedal and a brake opening degree corresponding to an operation amount of a brake pedal is less than or equal to a predetermined opening degree, while the stopped vehicle is recognized.

7 Claims, 3 Drawing Sheets

(52) U.S. Cl.
CPC . *B60W 2554/801* (2020.02); *B60W 2554/804* (2020.02); *B60W 2710/18* (2013.01); *B60W 2720/106* (2013.01)

(56) References Cited

U.S. PATENT DOCUMENTS

2010/0268432 A1   10/2010  Arai et al.
2014/0032094 A1*  1/2014  Heinrichs-Bartscher ............... B60T 7/22
   701/301
2015/0096821 A1*  4/2015  Arai ............... B60W 30/18072
   180/233

FOREIGN PATENT DOCUMENTS

JP   2006-264571 A   10/2006
JP   2009-149254 A   7/2009

* cited by examiner

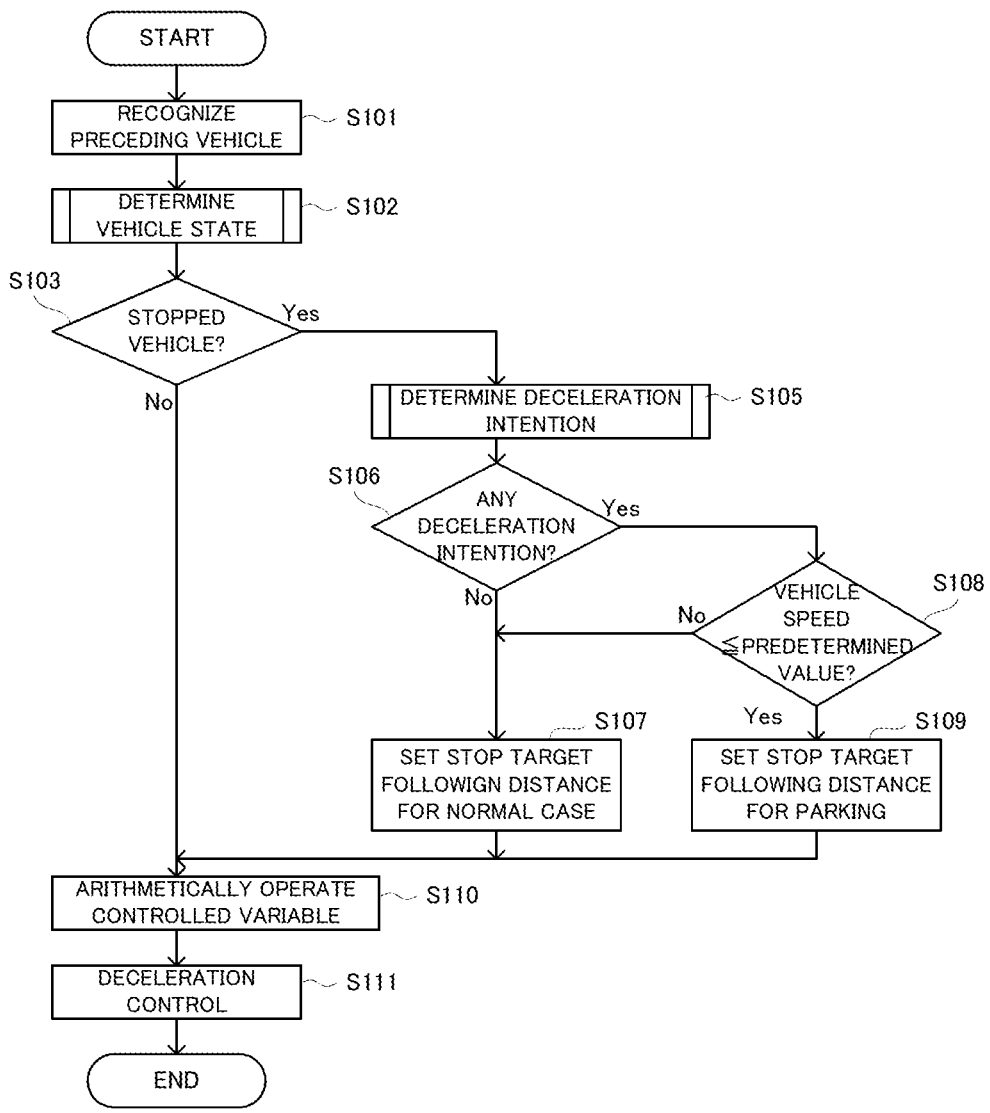

DRIVING ASSISTANCE APPARATUS

CROSS-REFERENCE TO RELATED APPLICATIONS

This application is based upon and claims the benefit of priority of the prior Japanese Patent Application No. 2018-209801, filed on Nov. 7, 2018, the entire contents of which are incorporated herein by reference.

BACKGROUND

1. Technical Field

Embodiments of the present disclosure relate to a driving assistance apparatus, and particularly relate to a driving assistance apparatus configured to provide assistance associated with a following distance or a distance between two vehicles.

2. Description of the Related Art

For this type of apparatus, for example, there is proposed an apparatus configured to properly use a following-distance detected value and a following-distance calculated value in accordance with whether or not a preceding vehicle is stopped, so as to achieve both control accuracy and a comfortable ride when a following distance control is performed on the preceding vehicle (refer to Japanese Patent Application Laid Open No. 2003-054289 (Patent Literature 1)). The other related prior art documents are Japanese Patent Application Laid Open No. 2009-149254 (Patent Literature 2), Japanese Patent Application Laid Open No. 2006-264571 (Patent Literature 3), and Japanese Patent Application Laid Open No. 2004-322729 (Patent Literature 4).

When a host vehicle stops behind a stopped preceding vehicle, if a target value, which indicates a following distance to the preceding vehicle when the host vehicle stops, is constant, then, a driver of the host vehicle may feel uncomfortable, which is technically problematic. In the technologies/techniques disclosed in the aforementioned Patent Literatures 1 to 4, it is extremely hard to solve this problem.

SUMMARY

In view of the aforementioned problem, it is therefore an object of embodiments of the present disclosure to provide a driving assistance apparatus configured to provide the assistance associated with the following distance while preventing the driver from feeling uncomfortable.

The above object of embodiments of the present disclosure can be achieved by a driving assistance apparatus configured to perform a stop control of stopping a host vehicle so that a following distance between the host vehicle and a stopped vehicle, which is ahead in a course of the host vehicle, approaches a target following distance, the driving assistance apparatus provided with: a recognizer configured to recognize the stopped vehicle; a speed detector configured to detect a speed of the host vehicle; and a setting device configured to set the target following distance smaller, if an operation speed is less than a predetermined speed, in comparison with that if the operation speed is greater than the predetermined speed, wherein the operation speed is a speed detected by the speed detector when one of an acceleration off operation in which a driver of the host vehicle releases an accelerator pedal and a brake off operation in which the driver releases a brake pedal is performed, or when one of an accelerator opening degree corresponding to an operation amount of the accelerator pedal and a brake opening degree corresponding to an operation amount of the brake pedal is less than or equal to a predetermined opening degree, while the stopped vehicle is recognized by the recognizer.

BRIEF DESCRIPTION OF THE DRAWINGS

FIG. 6 is a flowchart illustrating operations of the driving assistance apparatus according to the second embodiment.

DETAILED DESCRIPTION OF THE EMBODIMENTS

A driving assistance apparatus according to embodiments of the present disclosure will be explained with reference to the drawings.

First Embodiment

A driving assistance apparatus according to a first embodiment will be explained with reference to FIG. 1 to FIG. 4.

(Configuration)

Figure 1:
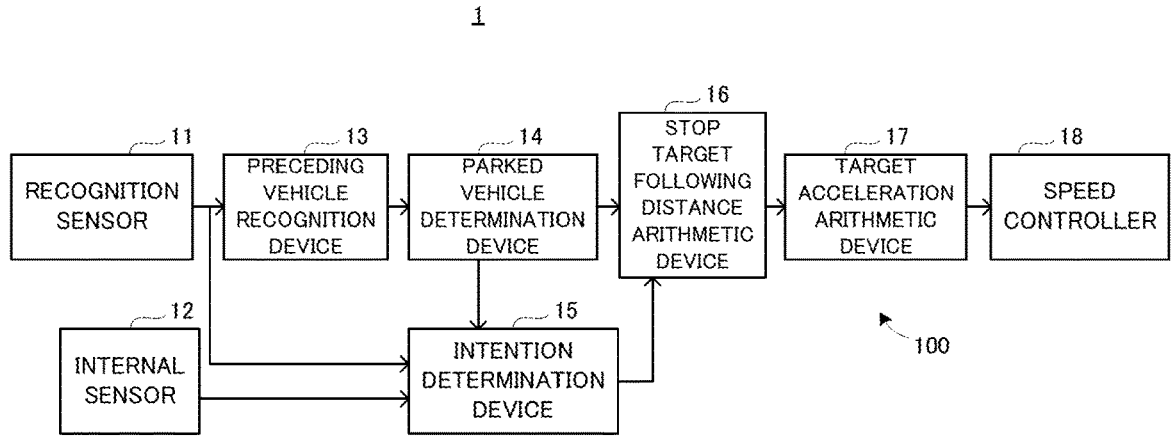
FIG. 1 is a block diagram illustrating a configuration of a driving assistance apparatus according to a first embodiment.

A configuration of the driving assistance apparatus according the first embodiment will be explained with reference to FIG. 1. FIG. 1 is a block diagram illustrating the configuration of the driving assistance apparatus according to the first embodiment.

In FIG. 1, a driving assistance apparatus 100 is mounted on a vehicle 1. The driving assistance apparatus 100 is configured to perform a following control. The following control is to control acceleration/deceleration so that the vehicle 1 drives while keeping a following distance during running, which is determined in advance for a preceding vehicle that travels ahead in a course of the vehicle 1 (e.g., a preceding vehicle that travels on the same traffic lane as the lane on which the vehicle 1 travels). The following control is also to control acceleration/deceleration so that the vehicle 1 stops at a predetermined interval from the preceding vehicle when the preceding vehicle stops.

When an operation of enabling the following control (e.g., a particular switch operation, etc.) is performed by a driver of the vehicle 1, the driving assistance apparatus 100 may perform the following control all the time until the driver performs an operation of disabling the following control. In other words, the following control is not automatically released or canceled once it is enabled or becomes effective. Alternatively, the driving assistance apparatus 100 may perform the following control all the time from ignition-on to ignition-off. In this case, the operation of enabling the following control by the driver is not necessary.

Particularly in the first embodiment, an explanation will be given to operations of the driving assistance apparatus 100 when the vehicle 1 equipped with the driving assistance apparatus 100 travels in a parking lot or on a road with a time limit parking section, while the following control is enabled.

The driving assistance apparatus 100 is provided with a recognition sensor 11, an internal sensor 12, a preceding vehicle recognition device 13, a parked vehicle determination device 14, an intention determination device 15, a stop target following distance arithmetic device 16, a target acceleration arithmetic device 17, and a speed controller 18.

The recognition sensor 11 may include, for example, an in-vehicle or onboard camera, a millimeter wave radar, and the like. The recognition sensor 11 is not necessarily independently provided for the driving assistance apparatus 100, and may be shared by another apparatus or system installed in the vehicle 1.

The internal sensor 12 may include, for example, a vehicle speed sensor, a steering angle sensor, an accelerator pedal sensor, a brake pedal sensor, and the like. The internal sensor 12 is not necessarily independently provided for the driving assistance apparatus 100, and may be shared by another apparatus or system installed in the vehicle 1.

The preceding vehicle recognition device 13 is configured to recognize a preceding vehicle on the basis of an output of the recognition sensor 11 (e.g., images photographed by the in-vehicle camera, a measurement result by the millimeter wave radar). Here, the preceding vehicle recognition device 13 is particularly configured to determine whether or not the recognized preceding vehicle is stopped. Specifically, the preceding vehicle recognition device 13 may determine whether or not the recognized preceding vehicle is stopped, for example, on the basis of a relative speed between the vehicle 1 and the preceding vehicle, and a speed of the vehicle 1. Alternatively, the determination may be performed on the basis of a relative position of the preceding vehicle with respect to the vehicle 1. A detailed explanation of the recognition of the preceding vehicle will be omitted because the existing technologies/techniques can be applied thereto.

The parked vehicle determination device 14 is configured to determine whether or not the preceding vehicle is parked if the preceding vehicle recognized by the preceding vehicle recognition device 13 is stopped. Specifically, the parked vehicle determination device 14 may determine whether or not the preceding vehicle is parked, for example, on the basis of at least one of a white line indicating a parking frame, an unlit brake lamp of the stopped preceding vehicle, and another one or plurality of vehicles stopped around the stopped preceding vehicle. A detailed explanation of the determination of a parked vehicle will be omitted because the existing technologies/techniques can be applied thereto.

The intention determination device 15 is configured to determine whether or not the driver of the vehicle 1 has a deceleration intention (hereinafter referred to a "deceleration intention determination", as occasion demands), on the basis of respective outputs of the recognition sensor 11 and the internal sensor 12. Specifically, the intention determination device 15 may perform the deceleration intention determination, on the basis of (i) a following distance between the vehicle 1 and the preceding vehicle that is obtained on the basis of the output of the recognition sensor 11 when the driver performs one of an acceleration-off operation of releasing the accelerator pedal and a brake-off operation of releasing the brake pedal (hereinafter referred to as an "off operation distance" as occasion demands), (ii) a speed of the vehicle 1 that is obtained on the basis of the output of the internal sensor 12 when the driver performs the aforementioned one operation (hereinafter referred to as an "off operation speed" as occasion demands), and (iii) a map illustrated in FIG. 2A to FIG. 2B. The deceleration intention determination may be performed if it is determined by the parked vehicle determination device 14 that the preceding vehicle is parked.

Figure 2A:
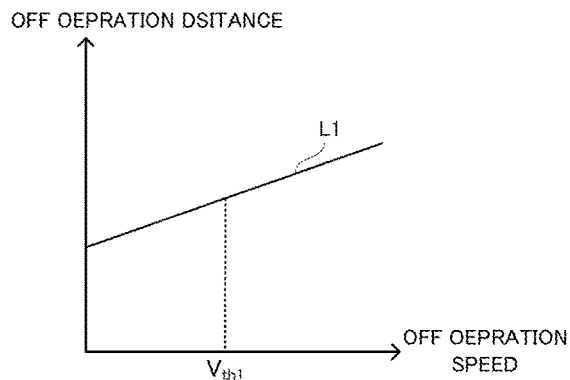
FIG. 2A is a diagram illustrating a map used for intention determination.

Here, FIG. 2A is an example of a map for determining whether or not the driver has the deceleration intention on the basis of the off operation speed and the off operation distance when the acceleration off operation is performed. The intention determination device 15 may determine that the driver has no deceleration intention if a point defined by the off operation speed and the off operation distance is in an area above a straight line L1 on the map illustrated in FIG. 2A. On the other hand, the intention determination device 15 may determine that the driver has the deceleration intention if the point defined by the off operation speed and the off operation distance is in an area below the straight line L1 on the map illustrated in FIG. 2A. If the point defined by the off operation speed and the off operation distance is on the straight line L1, this may be included and treated in either case. The off operation distance indicated by the straight line L1 depends on the off operation speed because a stop distance of the vehicle 1 depends on the speed. The same shall apply in FIG. 2B.

Figure 2B:
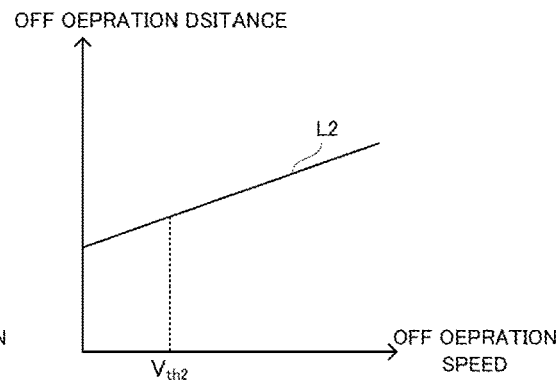
FIG. 2B is a diagram illustrating a map used for the intention determination.

FIG. 2B is an example of the map for determining whether or not the driver has the deceleration intention on the basis of the off operation speed and the off operation distance when the brake off operation is performed. The intention determination device 15 may determine that the driver has no deceleration intention if the point defined by the off operation speed and the off operation distance is in an area above a straight line L2 on the map illustrated in FIG. 2B. On the other hand, the intention determination device 15 may determine that the driver has the deceleration intention if the point defined by the off operation speed and the off operation distance is in an area below the straight line L2 on the map illustrated in FIG. 2B. If the point defined by the off operation speed and the off operation distance is on the straight line L2, this may be included and treated in either case.

The reason why the presence/absence of the deceleration intention is determined even when the brake off operation is performed, is as follows. On the driving assistance apparatus 100, if the acceleration off operation is performed and if it is determined that the driver has the deceleration intention, a deceleration control (or deceleration assistance) is performed as a part of the following control. On the driving assistance apparatus 100, when the driver steps down the brake pedal (i.e., when the driver performs a deceleration operation), the aforementioned deceleration control is not performed in deference to the driver's intention. The driver may feel uncomfortable in such a configuration that the deceleration control is performed when the acceleration off operation is performed, whereas any driving assistance is not performed when the brake off operation is performed. Thus, on the driving assistance apparatus 100, the presence/absence of the deceleration intention is determined even when the brake off operation is performed. If it is determined that the driver has the deceleration intention, then, the deceleration control is performed.

Back in FIG. 1, the stop target following distance arithmetic device 16 is configured to set a target following distance as a target following distance when the vehicle 1 stops behind the preceding vehicle, on the basis of respective determination results of the parked vehicle determination device 14 and the intention determination device 15. Specifically, if it is determined by the parked vehicle determination device 14 that the preceding vehicle is parked, and if it is determined by the intention determination device 15 that the driver has the deceleration intention, then, the stop target following distance arithmetic device 16 may set the target following distance on the basis of the off operation speed and maps illustrated in FIG. 3A to FIG. 3C. Here, a map indicating a relation between an off operation vehicle speed and the target following distance (refer to FIG. 3A to FIG. 3C) may be set, as occasion demands, in accordance with specifications of the driving assistance apparatus 100.

Figure 3A:
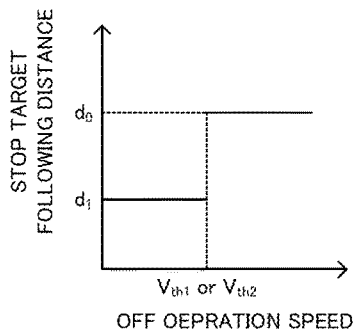
FIG. 3A is a diagram illustrating an example of a relation between a vehicle speed and a stop target following distance.

In the case of the map illustrated in FIG. 3A, the stop target following distance arithmetic device 16 sets the target following distance to $d_0$ when the off operation speed is greater than $V_{th1}$ or $V_{th2}$, and sets the target following distance to $d_1$ when the off operation speed is less than or equal to $V_{th1}$ or $V_{th2}$. In the case of the map illustrated in FIG. 3B, the stop target following distance arithmetic device 16 sets the target following distance to $d_0$ when the off operation speed is greater than $V_{th1}$ or $V_{th2}$, and sets a smaller target following distance as the off operation speed decreases in a range between $d_0$ and $d_1$ when the off operation speed is less than or equal to $V_{th1}$ or $V_{th2}$. In the case of the map illustrated in FIG. 3C, the stop target following distance arithmetic device 16 sets the target following distance to $d_0$ when the off operation speed is greater than $V_{th1}$ or $V_{th2}$, and sets a smaller target following distance as the off operation speed decreases in a range between $d_0$ and $d_1$ when the off operation speed is less than or equal to $V_{th2}$ and is greater than $V_1$, and sets the target following distance to $d_1$ when the off operation speed is less than $V_1$.

Figure 3B:
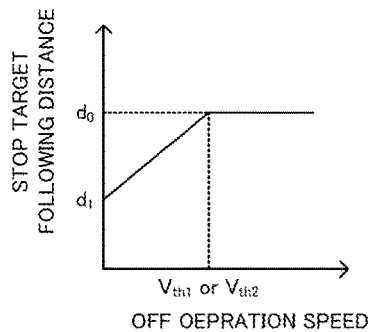
FIG. 3B is a diagram illustrating an example of the relation between the vehicle speed and the stop target following distance.
Figure 3C:
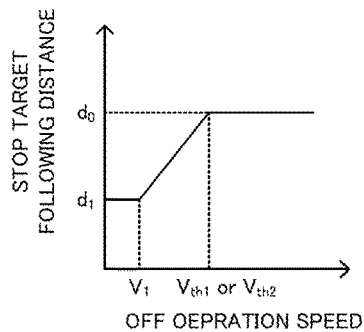
FIG. 3C is a diagram illustrating an example of the relation between the vehicle speed and the stop target following distance.

"$V_{th1}$" and "$V_{th2}$" in FIG. 3A to FIG. 3C respectively correspond to "$V_{th1}$" in FIG. 2A and "$V_{th2}$" in FIG. 2B. Here, "$V_{th2}$" is less than "$V_{th1}$" because when the vehicle 1 is parked by the brake operation by the driver using a creep phenomenon, a range of the vehicle speed is on a lower-speed side in comparison with that when the vehicle 1 is parked by the acceleration operation. In FIG. 3A to FIG. 3C, "$d_0$" means a target following distance for the normal case (i.e., a target following distance if the vehicle 1 is stopped due to a temporal stop of the preceding vehicle when the vehicle 1 travels behind the preceding vehicle by the following control). "$d_1$" may be less than "$d_0$", and may be set as occasion demands.

If it is determined by the parked vehicle determination device 14 that the preceding vehicle is not parked, or if it is determined by the intention determination device 15 that the driver has no deceleration intention, the stop target following distance arithmetic device 16 may set the target following distance to the target following distance for the normal case (corresponding to "$d_0$" in FIG. 3A to FIG. 3C).

The target acceleration arithmetic device 17 is configured to arithmetically operate target acceleration/deceleration to realize the target following distance arithmetically operated by the stop target following distance arithmetic device 16. A detailed explanation of the arithmetic operation of the target acceleration/deceleration will be omitted because the existing technologies/techniques can be applied thereto.

The speed controller 18 is configured or programmed to control, for example, a throttle actuator, a brake actuator, and the like, to realize the target acceleration/deceleration arithmetically operated by the target acceleration arithmetic device 17.

(Operations)

Next, with reference to a flowchart in FIG. 4, an explanation will be given to operations of the driving assistance apparatus 100 when the vehicle 1 travels in a parking lot or on a road with a time limit parking section while the following control is enabled.

Figure 4:
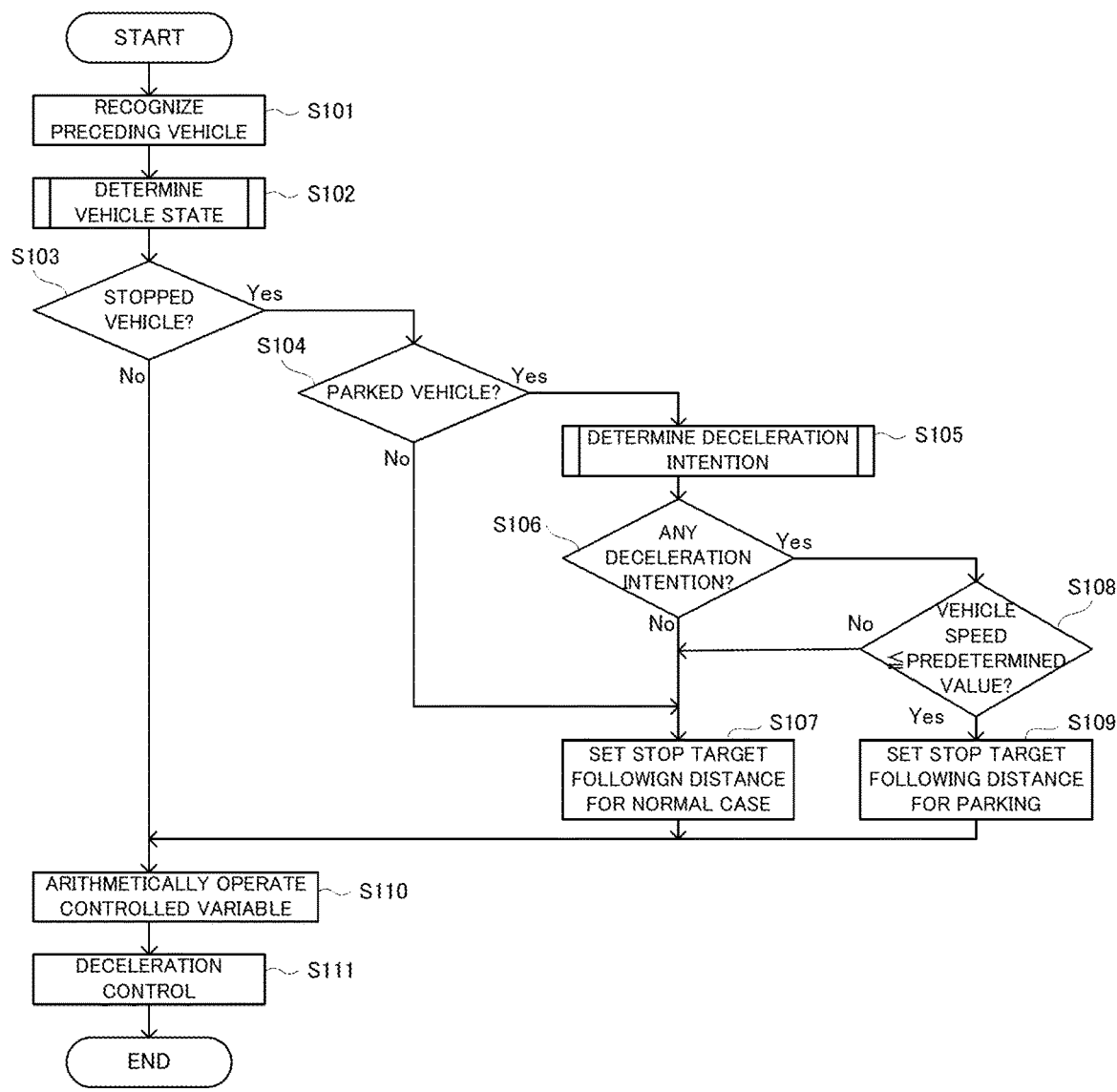
FIG. 4 is a flowchart illustrating operations of the driving assistance apparatus according to the first embodiment.

In FIG. 4, the preceding vehicle recognition device 13 recognizes the preceding vehicle of the vehicle 1 on the basis of the output of the recognition sensor 11 (step S101). In the step S101, if the preceding vehicle is recognized, a vehicle state determination is performed in which a state of the recognized preceding vehicle is determined (step S102). Specifically, the preceding vehicle recognition device 13 may determine whether or not the recognized preceding vehicle is stopped. The parked vehicle determination device 14 may determine whether or not the preceding vehicle is parked if it is determined by the preceding vehicle recognition device 13 that the preceding vehicle is stopped. In the step S101, if the preceding vehicle is not recognized, the operations illustrated in FIG. 4 are ended. Then, the step S101 may be performed after a lapse of a predetermined time (e.g., several ten milliseconds to several hundred milliseconds).

The intention determination device 15 determines whether or not the preceding vehicle is stopped on the basis of a result of the step S102 (step S103). In the step S103, if it is determined that the preceding vehicle is stopped (the step S103: Yes), the intention determination device 15 determines whether or not the preceding vehicle is parked on the basis of the result of the step S102 (step S104). In the step S104, if it is determined that the preceding vehicle is not parked (the step S104: No), a step S107 described later is performed.

In the step S104, if it is determined that the preceding vehicle is parked (the step S104: Yes), the intention determination device 15 determines whether or not the driver of the vehicle 1 has the deceleration intention on the basis of the respective outputs of the recognition sensor 11 and the internal sensor 12 (step S105).

The stop target following distance arithmetic device 16 determines whether or not the driver has the deceleration intention on the basis of a result of the step S105 (step S106). In the step S106, if it is determined that the driver has the deceleration intention (the step S106: Yes), the stop target following distance arithmetic device 16 determines whether or not the off operation speed is less than or equal to a predetermined value (step S108). Here, the predetermined value is (i) "$V_{th1}$" in FIG. 2A if the off operation speed is an off operation speed corresponding to the acceleration off operation, and (ii) "$V_{th2}$" in FIG. 2B if the off operation speed is an off operation speed corresponding to the brake off operation.

In the step S108, if it is determined that the off operation speed is less than or equal to the predetermined value (the step S108: Yes), the stop target following distance arithmetic device 16 sets the target following distance to a target following distance for parking, which is shorter than the target following distance for the normal case (corresponding to "$d_0$" in FIG. 3A to FIG. 3C) (step S109).

On the other hand, in the step S108, if it is determined that the off operation speed is greater than the predetermined value (the step S108: No), the stop target following distance arithmetic device 16 sets the target following distance to the target following distance for the normal case (step S107). It is because when the driver actually performs a parking operation, the off operation speed is smaller than those in the other cases. In other words, it is because there is a relatively high possibility that the driver actually does not park the vehicle 1 if the off operation speed is relatively large even when it is determined by the intention determination device 15 that the drier has the deceleration intention.

In the step S106, if it is determined that the driver has no deceleration intention (the step S106: No), the stop target following distance arithmetic device 16 sets the target following distance to the target following distance for the normal case (step S107).

After the step S107 or S109 described above, the target acceleration arithmetic device 17 arithmetically operates the target acceleration/deceleration (i.e., a controlled variable) to realize the target following distance arithmetically operated in the step S107 or S109 (step S110). Alternatively, in the step S103, if it is determined that the preceding vehicle is not stopped (the step S103: No), the target acceleration arithmetic device 17 arithmetically operates the target acceleration/deceleration so that the vehicle 1 drives while keeping the following distance during running, which is determined in advance for the preceding vehicle that travels ahead (the step S110).

The speed controller 18 then controls, for example, the throttle actuator, the brake actuator, and the like, to realize the target acceleration/deceleration arithmetically operated by the target acceleration arithmetic device 17 (step S111). After the step S111, the step S101 may be performed after a lapse of a predetermined time.

(Technical Effect)

As in the driving assistance apparatus 100, in such a configuration that the following control is performed all the time, the following control is not automatically released or canceled even on general roads or in traffic jams in which running and stops are relatively frequently repeated. Thus, after the following control is released, the driver does not have to perform the operation of enabling the following control again. In other words, according to the driving assistance apparatus 100, it is possible to appropriately perform the following control even on general roads or in traffic jams, thereby to reduce the driver's operation load (e.g., an accelerator pedal operation, a brake pedal operation, the operation of enabling the following control, etc.).

On the other hand, in such a configuration that the following control is performed all the time, for example, due to that a parked vehicle is recognized as a preceding vehicle in a parking lot, the following control for the parked vehicle (specifically, for example, a control of stopping a vehicle at a predetermined interval from the parked vehicle) is performed, and the vehicle may stop before a stop position intended by a driver who tries to park the vehicle, which is technically problematic.

On the driving assistance apparatus 100, however, it is determined by the parked vehicle determination device 14 whether or not the preceding vehicle recognized by the preceding vehicle recognition device 13 is parked (i.e., whether or not the preceding vehicle is the parked vehicle). In addition, it is determined by the intention determination device 15 whether or not the driver has the deceleration intention. Then, on the basis of the respective determination results of the parked vehicle determination device 14 and the intention determination device 15, the target following distance for the normal case or the target following distance for parking is set as the target following distance by the stop target following distance arithmetic device 16. Thus, according to the driving assistance apparatus 100, even if the parked vehicle is recognized as the preceding vehicle in the parking lot, the following control allows the vehicle 1 to be stopped near the stop position intended by the driver. Therefore, the driving assistance apparatus 100 allows the assistance associated with the following distance while preventing the driver from feeling uncomfortable.

Modified Example

In the first embodiment described above, the presence/absence of the deceleration intention of the driver is determined on the basis of the off operation speed and the off operation distance when the acceleration off operation or the brake off operation is performed. The presence/absence of the deceleration intention may be determined, on the basis of (i) a speed of the vehicle 1 that is obtained on the basis of the output of the internal sensor 12 when one of an accelerator opening degree corresponding to an operation amount of the accelerator pedal and a brake opening degree corresponding to an operation amount of the brake pedal is less than or equal to a predetermined opening degree, and (ii) the following distance between the vehicle 1 and the preceding vehicle that is obtained on the basis of the output of the recognition sensor 11.

Second Embodiment

Figure 5:
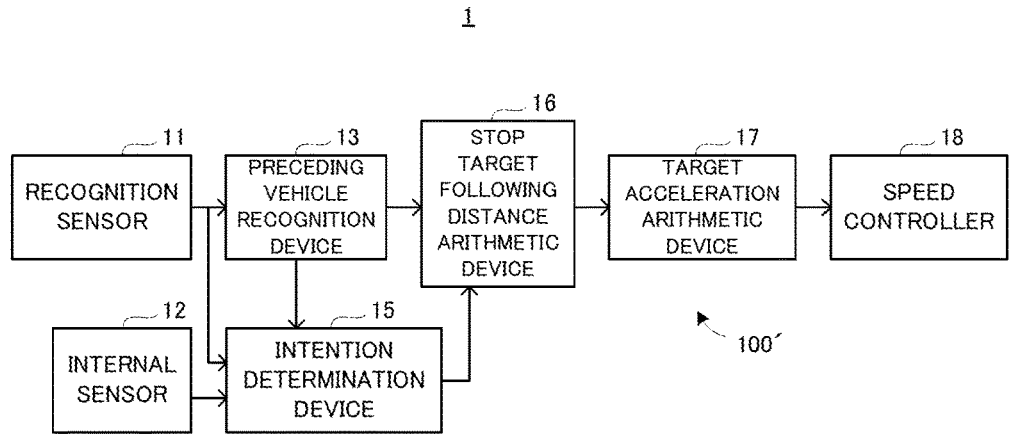
FIG. 5 is a block diagram illustrating a configuration of a driving assistance apparatus according to a second embodiment.

A driving assistance apparatus according to a second embodiment will be explained with reference to FIG. 5 and FIG. 6. The second embodiment is the same as the aforementioned first embodiment, except an apparatus configuration is partially different. Thus, in the second embodiment, the same explanation as that in the first embodiment will be omitted, and the same parts on the drawings will carry the same reference numerals. Basically different points will be explained with reference to FIG. 5 and FIG. 6.

(Configuration)

A configuration of the driving assistance apparatus according to the second embodiment will be explained with reference to FIG. 5. FIG. 5 is a block diagram illustrating the configuration of the driving assistance apparatus according to the second embodiment.

In FIG. 2, a driving assistance apparatus 100' is provided with a recognition sensor 11, an internal sensor 12, a preceding vehicle recognition device 13, an intention determination device 15, a stop target following distance arithmetic device 16, a target acceleration arithmetic device 17, and a speed controller 18. On the driving assistance apparatus 100', the operations of the intention determination device 15 is partially different from those in the aforementioned first embodiment. The driving assistance apparatus 100' is not provided with a parked vehicle determination device 14, in comparison with the driving assistance apparatus 100 according to the first embodiment described above.

Particularly in the second embodiment, an explanation will be given to operations of the driving assistance apparatus 100' when the vehicle 1 equipped with the driving assistance apparatus 100' travels on a road while the following control is enabled.

(Operations)

In FIG. 6, if it is determined that the preceding vehicle recognized in the step S101 is stopped (the step S103: Yes), the intention determination device 15 determines whether or not the driver of the vehicle 1 has the deceleration intention on the basis of the respective outputs of the recognition sensor 11 and the internal sensor 12 (the step S105).

(Technical Effect)

If the vehicle 1 stops after the preceding vehicle due to a red light, and for example, if the stop position of the vehicle 1 is near an entrance/exit of a parking lot of a commercial facility, in some cases, the driver of the vehicle 1 may try to reduce the following distance to the preceding vehicle for another vehicle that is about to enter the parking lot or to leave the parking lot. At this time, if the target following distance to the stopped preceding vehicle is constant, the following control may interfere with the driver's operation of reducing the following distance and the driver may feel uncomfortable, which is technically problematic.

On the driving assistance apparatus 100', however, the presence/absence of the deceleration intention of the driver is determined by the intention determination device 15. Then, on the basis of the determination result of the intention determination device 15, the target following distance for the normal case or the target following distance for parking is set as the target following distance by the stop target following distance arithmetic device 16. Therefore, the driving assistance apparatus 100' allows the assistance associated with the following distance while preventing the driver from feeling uncomfortable.

Various aspects of embodiments of the present disclosure derived from the embodiments and modified example explained above will be explained hereinafter.

A driving assistance apparatus according to an aspect of embodiments of the present disclosure is a driving assistance apparatus configured to perform a stop control of stopping a host vehicle so that a following distance between the host vehicle and a stopped vehicle, which is ahead in a course of the host vehicle, approaches a target following distance, the driving assistance apparatus provided with: a recognizer configured to recognize the stopped vehicle; a speed detector configured to detect a speed of the host vehicle; and a setting device configured to set the target following distance smaller, if an operation speed is less than a predetermined speed, in comparison with that if the operation speed is greater than the predetermined speed, wherein the operation speed is a speed detected by the speed detector when one of an acceleration off operation in which a driver of the host vehicle releases an accelerator pedal and a brake off operation in which the driver releases a brake pedal is performed, or when one of an accelerator opening degree corresponding to an operation amount of the accelerator pedal and a brake opening degree corresponding to an operation amount of the brake pedal is less than or equal to a predetermined opening degree, while the stopped vehicle is recognized by the recognizer.

In the aforementioned embodiments, the "preceding vehicle recognition device 13" corresponds to an example of the "recognizer", the "internal sensor 12" corresponds to the "speed detector", and the "stop target following distance arithmetic device 16" corresponds to an example of the "setting device". The "off operation speed" according to the aforementioned embodiments corresponds to an example of the "operation speed". The "predetermined value" according to the aforementioned embodiments (e.g., refer to the "predetermined value" in the step S108) corresponds to an example of the "predetermined speed".

If the acceleration off operation or the brake off operation is performed when the speed of the host vehicle is relatively low, in many cases, the driver of the host vehicle has some purpose (e.g., a purpose to reduce the following distance to the stopped vehicle, a purpose to park the host vehicle behind the parked vehicle, which is the stopped vehicle, etc.) for the low-speed traveling. In the same manner, if the accelerator opening degree or the brake opening degree is less than or equal to the predetermined opening degree (in other words, if an amount of stepping the accelerator pedal or the brake pedal is relatively small) when the speed of the host vehicle is relatively low, in many cases, the driver has some purpose for the low-speed traveling. At this time, if the target following distance associated with the stop control is constant, there is a possibility that the host vehicle may stop before a stop position intended by the driver. As a result, due to the stop control, the driver may feel uncomfortable.

On the driving assistance apparatus, however, if the operation speed is less than the predetermined speed, the target following distance is set smaller by the setting device, in comparison with that if the operation speed is greater than the predetermined speed. Thus, on the driving assistance apparatus, the stop control allows the host vehicle to be stopped near the stop position intended by the driver. Therefore, the driving assistance apparatus allows the assistance associated with the following distance while preventing the driver from feeling uncomfortable.

The "predetermined speed" may be a value for determining whether or not the target following distance is set relatively small, and may be set in advance as a fixed value, or a variable value corresponding to some physical quantity or parameter. The "predetermined speed" may be set as follows: for example, obtaining a relation between the operation speed and the stopped vehicle when the host vehicle stops, by experiments, experiences, or simulations, and setting as an operation speed at which the following distance starts to be shorter than a general stop following distance (e.g., 4 to 5 meters) on the basis of the obtained relation.

The "predetermined opening degree" may be a value for determining whether or not the operation speed is to be detected, and may be set in advance as a fixed value, or a variable value corresponding to some physical quantity or parameter. The "predetermined opening degree" may be set as follows: for example, obtaining a relation between an opening degree at a time point and a possibility of releasing the accelerator pedal or the brake pedal later, for each of the accelerator opening degree and the brake opening degree, by experiments, experiences, or simulations, and setting as an opening degree with a relatively high possibility of releasing the accelerator pedal or the brake pedal, on the basis of the obtained relation. The "predetermined opening degree" may be a common value for the accelerator opening degree and the brake opening degree, or may be also set for each of the accelerator opening degree and the brake opening degree.

In an aspect of the driving assistance apparatus, it is further provided with a distance detector configured to detect the following distance, wherein the setting device is configured to set the target following distance smaller, in comparison with that if the operation speed is greater than the predetermined speed, (i) if an operation distance is less than or equal to a predetermined distance, which is determined in accordance with the operation speed, and (ii) if the operation speed is less than the predetermined speed, wherein the operation distance is a following distance detected by the distance detector when one of the operations is performed, or when one of the opening degrees is less than or equal to the predetermined opening degree, while the stopped vehicle is recognized by the recognizer. The "off operation distance" according to the aforementioned embodiments corresponds to an example of the "operation distance".

If the operation distance is greater than the predetermined distance, there is a possibility that the driver has performed the acceleration off operation or the brake off operation, independently of the stopped vehicle. Alternatively, there is a possibility that the accelerator opening degree or the brake opening degree has become relatively small, independently of the stopped vehicle. In this aspect, if the operation distance is less than or equal to the predetermined distance, which is determined in accordance with the operation speed, and if the operation speed is less than the predetermined speed, the target following distance is set smaller by the setting device, in comparison with that if the operation speed is greater than the predetermined speed. Thus, according to this aspect, the target following distance can be preferably set.

The "predetermined distance" may be a value determined in accordance with the operation speed (i.e., a variable value corresponding to the operation speed), and one of values for determining whether or not the target following distance is set relatively small. The "predetermined distance" may be set as follows: for example, obtaining the following distance between the host vehicle and the stopped vehicle when the acceleration off operation or the brake off operation is performed due to the stopped vehicle, or when the accelerator opening degree or the brake opening degree is less than or equal to the predetermined opening degree due to the stopped vehicle, for each operation speed, by experiments, experiences, or simulations, and then, setting a maximum value of the obtained following distance as a predetermined distance of the corresponding operation speed.

In another aspect of the driving assistance apparatus, it is further provided with a determinator configured to determine whether or not the stopped vehicle recognized by the recognizer is a parked vehicle, wherein the setting device is configured to set the target following distance smaller if the operation speed is less than the predetermined speed, in comparison with that if the operation speed is greater than the predetermined speed, on condition that it is determined that the stopped vehicle recognized is the parked vehicle. In the aforementioned embodiments, the "parked vehicle determination device 14" corresponds to an example of the "determinator".

If the stopped vehicle is the parked vehicle and the operation speed is relatively low, the driver likely parks the host vehicle behind the stopped vehicle. Then, if the driver parks the host vehicle behind the stopped vehicle, the driver makes the following distance relatively short in many cases. Therefore, in a configuration as described above, the stop control allows the host vehicle to be stopped near the stop position intended by the driver.

In another aspect of the driving assistance apparatus, the driving assistance apparatus is configured to control acceleration/deceleration of the host vehicle so as to follow a preceding vehicle that travels ahead in the course of the host vehicle, and is configured to perform a following control of stopping the host vehicle when the preceding vehicle stops while following the preceding vehicle, and is configured to perform the stop control of stopping the host vehicle so that the following distance to the stopped vehicle, which is the preceding vehicle that is stopped, approaches the target following distance, as a part of the following control.

According to this aspect, when the preceding vehicle stops while the host vehicle follows the preceding vehicle in a situation in which running and stops are relatively frequently repeated, such as, for example, in traveling on general roads or in traffic jams, it is possible to stop the host vehicle near the stop position intended by the driver (in other words, with a following distance that is close to a following distance intended by the driver).

The present disclosure may be embodied in other specific forms without departing from the spirit or essential characteristics thereof. The present embodiments and examples are therefore to be considered in all respects as illustrative and not restrictive, the scope of the disclosure being indicated by the appended claims rather than by the foregoing description and all changes which come in the meaning and range of equivalency of the claims are therefore intended to be embraced therein.

What is claimed is:

1. A driving assistance apparatus configured to perform a stop control of stopping a host vehicle so that a following distance between the host vehicle and a stopped vehicle, which is ahead in a course of the host vehicle, approaches a target following distance, said driving assistance apparatus comprising:
    a recognizer configured to recognize the stopped vehicle;
    a speed detector configured to detect a speed of the host vehicle; and
    a setting device configured to set the target following distance smaller, if an operation speed is less than a predetermined speed, in comparison with that if the operation speed is greater than the predetermined speed, wherein the operation speed is a speed detected by said speed detector when one of an acceleration off operation in which a driver of the host vehicle releases an accelerator pedal and a brake off operation in which the driver releases a brake pedal is performed, or when one of an accelerator opening degree corresponding to an operation amount of the accelerator pedal and a brake opening degree corresponding to an operation amount of the brake pedal is less than or equal to a predetermined opening degree, while the stopped vehicle is recognized by said recognizer.

2. The driving assistance apparatus according to claim 1, further comprising a distance detector configured to detect the following distance, wherein
    said setting device is configured to set the target following distance smaller, in comparison with that if the operation speed is greater than the predetermined speed, (i) if an operation distance is less than or equal to a predetermined distance, which is determined in accordance with the operation speed, and (ii) if the operation speed is less than the predetermined speed, wherein the operation distance is a following distance detected by said distance detector when one of the operations is performed, or when one of the opening degrees is less than or equal to the predetermined opening degree, while the stopped vehicle is recognized by said recognizer.

3. The driving assistance apparatus according to claim 1, further comprising a determinator configured to determine whether or not the stopped vehicle recognized by said recognizer is a parked vehicle, wherein
    said setting device is configured to set the target following distance smaller if the operation speed is less than the predetermined speed, in comparison with that if the operation speed is greater than the predetermined speed, on condition that it is determined that the stopped vehicle recognized is the parked vehicle.

4. The driving assistance apparatus according to claim 1, wherein said driving assistance apparatus
    is configured to control acceleration/deceleration of the host vehicle so as to follow a preceding vehicle that travels ahead in the course of the host vehicle, and is configured to perform a following control of stopping the host vehicle when the preceding vehicle stops while following the preceding vehicle, and is configured to perform the stop control of stopping the host vehicle so that the following distance to the stopped vehicle, which is the preceding vehicle that is stopped, approaches the target following distance, as a part of the following control.

5. The driving assistance apparatus according to claim 2, further comprising a determinator configured to determine whether or not the stopped vehicle recognized by said recognizer is a parked vehicle, wherein said setting device is configured to set the target following distance smaller if the operation speed is less than the predetermined speed, in comparison with that if the operation speed is greater than the predetermined speed, on condition that it is determined that the stopped vehicle recognized is the parked vehicle.

6. The driving assistance apparatus according to claim 2, wherein said driving assistance apparatus is configured to control acceleration/deceleration of the host vehicle so as to follow a preceding vehicle that travels ahead in the course of the host vehicle, and is configured to perform a following control of stopping the host vehicle when the preceding vehicle stops while following the preceding vehicle, and is configured to perform the stop control of stopping the host vehicle so that the following distance to the stopped vehicle, which is the preceding vehicle that is stopped, approaches the target following distance, as a part of the following control.

7. The driving assistance apparatus according to claim 3, wherein said driving assistance apparatus is configured to control acceleration/deceleration of the host vehicle so as to follow a preceding vehicle that travels ahead in the course of the host vehicle, and is configured to perform a following control of stopping the host vehicle when the preceding vehicle stops while following the preceding vehicle, and is configured to perform the stop control of stopping the host vehicle so that the following distance to the stopped vehicle, which is the preceding vehicle that is stopped, approaches the target following distance, as a part of the following control.

* * * * *